C. D. Gibson,
Car Ventilator,
Nº 39,140.   Patented July 7, 1863.
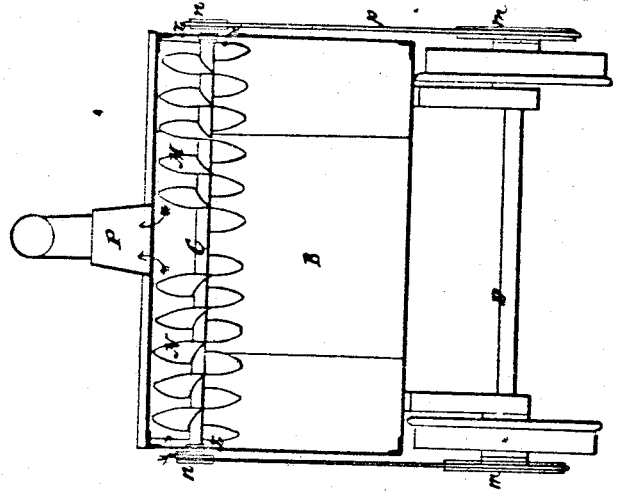
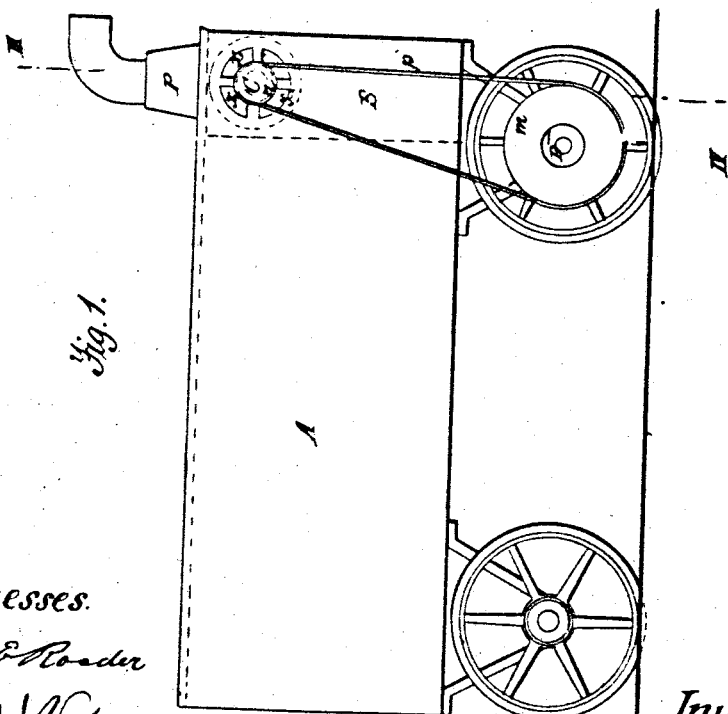
Witnesses.
Inventor.
Charles Dana Gibson

UNITED STATES PATENT OFFICE.

CHARLES DANA GIBSON, OF NEW YORK, N. Y.

IMPROVEMENT IN VENTILATING RAILROAD-CARS.

Specification forming part of Letters Patent No. 39,140, dated July 7, 1863.

*To all whom it may concern:*

Be it known that I, CHARLES DANA GIBSON, of New York, in the county and State of New York, have invented a new and useful Improvement in the Mode of Ventilating Cars; and I do hereby declare that the following is a full and exact description thereof, reference being had to the accompanying drawings, and to the letters of reference marked thereon.

Figure I represents a side view of a locomotive-tender with my improved arrangement shown in dotted lines. Fig. II shows a cross-section of the same at the line III IV.

Similar letters represent similar parts.

The nature of my invention consists in the arrangement of a right and of a left handed screw upon the same shaft, situated in the after part of the water-tank of a locomotive-tender above the level of the water, and so arranged that the air will be drawn in at the sides of the tender and expelled at the top, near the center, through a pipe which conducts the air to the different cars.

In the accompanying drawings, A represents a locomotive-tender constructed in the usual manner. In the after part of the water-tank B a shaft, C, is situated, running in suitable bearings attached to the side of the tender, and provided with small pulleys $n\ n$ on the ends, over which bands $p\ p$ pass, which pass over pulleys $m\ m$, fast to the after wheel-axle D, and through which motion is communicated to the shaft C. This shaft C is provided at one side of the center with a right-handed screw, N, and at the other side of its center with a left-handed screw, M. On the top of the water tank, near the center, a pipe, P, is attached, which is connected, through any suitable coupling, with pipes situated on the top of the cars, and arranged with suitable outlets for the air into said cars. The shaft C, with its screw-wheels N and M, is situated in the top part of the water-tank B, above the level of the water. The air enters through the sides of the tender through suitable openings, $x$, near the shaft-bearings, where the air is still pure, and only little mixed with dust occasioned by the velocity of the train, and is still further purified and cooled while passing over the surface of the water in the tank. By the action of the right and left handed screw-wheels N and M the air is forced toward the center into the upright pipe P on the top of the water-tank B, and from there into the several cars of the train.

What I claim as my invention, and desire to secure by Letters Patent, is—

The arrangement of a shaft, C, provided with right and left handed screw-wheels N and M in the water-tank of a locomotive-tender, above the level of the water, in combination with suitable openings in the sides of the tender, and with an escape-pipe, P, on the top of the tender, and operated in the manner and for the purpose as described and set forth.

CHARLES DANA GIBSON.

Witnesses:
T. RICHD. VOSE,
HENRY E. ROEDER.